Patented Dec. 8, 1931

1,835,474

UNITED STATES PATENT OFFICE

CLYDE C. DE WITT, OF HOUGHTON, MICHIGAN

LEACHING ORE

No Drawing.  Application filed March 8, 1930. Serial No. 434,467.

This invention relates to a method of extracting manganese values from its carbonate and oxide ores.

The principal object is to obtain a manganese compound of substantial purity that may be used for the manufacture of ferromanganese.

Another object of this invention is to provide a source of manganese compounds which may be useful articles of commerce.

Another object of this invention is to provide a method for the extraction of manganese from low grade ores by suitable concentration of these values by chemical treatment of the ores in such a manner as to obtain at a relatively small cost usable manganese compounds from ores of such quality as exist in the United States.

Manganese is a necessary and important component of most steels and of many other metallic alloys of industrial importance. In the United States the principal ores are the manganese carbonate and the manganese dioxide. The latter is the least important as to quality of the ore, generally running low in manganese content. The manganese carbonate ores contain substantial amounts of manganese dioxide. Any attempt to extract the manganese from such ores must therefore be able to remove the manganese from both of these forms of compounds and to leave the product in a usable form.

Accordingly, I have discovered a method of extracting these compounds of manganese in the form of a usable product. This process of extraction is accomplished at a reasonable cost where the materials and ores are to be found.

When an ore containing a carbonate and/or an oxide of manganese is subjected to the action of a calcium chloride solution (or the solution of certain other chlorides as will hereinafter be pointed out) only a small portion of the manganese will dissolve, for there is speedily set up an equilibrium condition which does not allow the action to proceed even tho the reaction mixture be heated for a long time at the boiling point of the solution. I have found that this equilibrium condition may be easily upset in such a manner as to cause the solution of the manganese content of the ore to proceed rapidly in the presence of a small excess of calcium chloride. The method of making this reaction go to completion depends on the fact that when manganese carbonate or manganese dioxide is treated with a solution of calcium chloride to which has been added sulphurous acid, (a water solution of sulphurous acid is obtained by burning sulphur in air and dissolving the resultant sulphur dioxide in water), the manganese values go into solution along with certain other metallic values.

This solution absorbs oxygen very readily. In doing so the sulphites formed in the original solution process are converted into sulphates. When the manganese dioxide goes into solution in sulphurous acid there is formed at first manganese dithionate

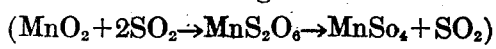
$(MnO_2 + 2SO_2 \rightarrow MnS_2O_6 \rightarrow MnSO_4 + SO_2)$ which quickly decomposes into manganese sulphate and sulphur dioxide. The calcium chloride in the presence of soluble sulphates is converted into insoluble calcium sulphate. Any manganese in the form of $MnSO_4$ is, by this reaction, converted into soluble manganese chloride.

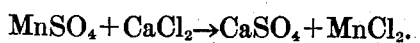
$MnSO_4 + CaCl_2 \rightarrow CaSO_4 + MnCl_2.$

Thus by the addition of a suitable compound or addition agents a reaction which would otherwise not go to completion, but speedily approach an impractical equilibrium, is forced to go to completion by such an addition of compounds or addition agents, and in the process of the reaction the addition agent's negative radical, together with the positive radical or metallic constituent of the leaching agent are removed from the zone of the reaction in the form of an insoluble, non-interfering precipitate. The negative radical of the leaching agent then combines with the positive radical or metallic value of the ore taking it into solution.

$$MnCO_3 + CaCl_2 \rightleftharpoons MnCl_2 + CaCO_3$$
$$MnCO_3 + CaCl_2 + H_2SO_3 + O \rightarrow MnCl_2 + CaSO_4 + H_2O + CO_2$$

$CaSO_4$ is an insoluble precipitate which is carried out with the ore gangue.

Should the ore contain manganese in a higher state of oxidation than in manganese carbonate then the addition of an oxidizing agent to the leached values is unnecessary.

In the process of solution other materials are dissolved and are likewise in solution in the form of soluble chlorides and must be removed from the solution. This removal is accomplished in accordance with the present invention in an efficient manner by treating the resultant solution of manganese and other chlorides with finely divided calcium carbonate whereby substantially all of the iron and aluminum and other metallic substances are precipitated in the form of metallic hydroxides or carbonates, leaving the manganese chloride in solution together with an excess of calcium chloride. The precipitated material may be removed in each case by any suitable means. The manganese chloride may be recovered by evaporation and fractional crystallization, or the manganese chloride solution may be treated with finely powdered calcium carbonate and heated under pressure, which treatment will precipitate the manganese as manganese carbonate and leave in the solution calcium chloride which may be returned to the process at the point indicated above.

The precipitated manganese carbonate is of course removed from the solution by any appropriate means. The precipitated manganese carbonate may be used as such or it may be heated to a moderately high temperature and thus converted to an oxide of manganese. If it is desirable the carbon dioxide obtained from the latter operation may be recovered by suitable well known methods.

The chloride of any metal whose sulphate is substantially insoluble in water solutions of the material used in this process, may be used in this process. The reason for preferably using the chloride of calcium is that of relative cost. The specific function of the chloride does not consist entirely in either the process of solution of the manganese values from the ore but it does provide the means of obtaining a final compound of manganese and chlorine in solution, which is amenable to the double treatment with calcium carbonate for the removal of impurities at atmospheric pressure and the final recovery of the manganese values ($MnCO_3$) from the purified $MnCl_2$ solution at pressures substantially higher than atmospheric under the influence of heat. The chlorides of calcium, barium, and strontium are soluble in water at ordinary temperatures and their sulphates are substantially insoluble in water, and therefore in the solutions of the materials used in this process. Lead chloride is not very soluble in water at ordinary temperatures tho quite soluble at the temperature of boiling water. Lead sulphate is substantially insoluble in water at ordinary temperatures. The lead compound of chlorine I prefer not to use on account of the cost and the extreme variation of the solubility of its chloride. In accordance with the above explanation, it will be understood in the appended claims that where "a soluble chloride of a metal whose sulphate is substantially insoluble in water," or an equivalent phrase, is used, such phrase is to be interpreted to mean either the chloride of calcium, barium, strontium or lead.

The process of leaching the ore may of course be combined with the final grinding process. It is preferable to use finely divided ore for the leaching process so as to provide a means of speeding up the leaching process. If the leaching is carried out with a warm or hot solution the time of extraction is appreciably shortened, particularly if care is taken to recover the sulphurous acid fumes that escape from heated solutions. Countercurrent leaching in any case of extraction by leaching is the most efficient method of leaching.

My preferred method of extracting or leaching manganese values from an ore of the carbonate or oxide type is to treat the finely divided ore with a solution of calcium chloride which contains sufficient sulphur dioxide in solution to cooperate with the calcium chloride and bring about the solution of the manganese in such a manner as combined with the action of an oxidizing agent, or, in the absence of an added oxidizing agent, will furnish a solution of manganese chloride and an insoluble non-interfering removable precipitate containing substantially all of the addition agents except the chloride radical.

The solution of manganese chloride and other chlorides is then separated from the gangue material and treated with finely divided calcium carbonate at ordinary atmospheric pressure, preferably in the absence of an oxidizing atmosphere, to precipitate the hydroxides and carbonates of the metals such as iron, aluminum, etc. The precipitated hydroxides and carbonates are removed from the solution by any suitable means. The resultant solution of manganese chloride and calcium chloride may be concentrated by evaporation and the manganese chloride recovered by fractional crystallization.

For metallurgical uses I prefer that the manganese chloride be converted into an oxide of manganese. This is accomplished by heating the solution under pressure with the proper amount of finely powdered calcium carbonate, a slight excess of the carbonate does no harm other than to slightly contaminate the final precipitate of manganese carbonate which is obtained by this treatment. After filtration, the precipitated manganese carbonate is suitably dried and calcined at moderately high temperatures to obtain the final product, an oxide of manganese. The final solution of calcium chloride is returned to the process after suitable dilution or concentration at the point indicated above.

Formal changes may be made in the specific embodiment of the invention described without departing from the spirit and substance of the broad invention, the scope of which is commensurate with the appended claims.

What I claim is:—

1. In the leaching of a manganese ore to obtain manganese values therefrom, the step of treating said ore with a solution containing a soluble chloride of a metal whose sulphate is substantially insoluble in water, and sulphurous acid.

2. In the leaching of a manganese ore, the step of treating said ore with a water solution of a soluble chloride of a metal whose sulphate is substantially insoluble in water, together with sulphurous acid, and with the subsequent addition of an oxidizing agent.

3. The method of leaching a manganese ore comprising in treating said ore with a solution containing a soluble chloride of an element whose sulphate is substantially insoluble in water, and sulphurous acid, followed by the addition of calcium carbonate to the solution to cause precipitation of the impurities.

4. In extracting manganese values from ore, the step of subjecting said ore to a sulphurated solution of calcium chloride and sulphur dioxide.

5. In extracting manganese values from ore, the step of subjecting said ore to a water solution of calcium chloride and sulphurous acid.

6. The method of extracting manganese values from ore comprising in subjecting said ore to a water solution of a soluble chloride of a metal whose sulphate is insoluble in said solution and sulphur dioxide, and then treating the resultant solution with a carbonate which will react with all of the metallic elements therein, except manganese and the metallic element of said chloride, to cause precipitation thereof.

7. The method of extracting manganese values from ore comprising subjecting said ore to a water solution of a soluble chloride of a metal whose sulphate is substantially insoluble in water, and in a water solution of sulphur dioxide, and treating the resultant solution with a material which will react with all of the metallic elements in said solution, except manganese and the metallic element of said chloride, to cause precipitation thereof as hydroxides.

8. The method of extracting manganese values from ore comprising in subjecting said ore to the action of a sulphurated solution of a chloride whose sulphate is insoluble in the solution, and then subjecting the resulting solution to the action of a carbonate.

9. The method of extracting manganese values from ore comprising in subjecting said ore to a water solution of a calcium chloride and sulphur dioxide, and then treating the resultant solution with a carbonate which will react with all of the metallic elements, except manganese and calcium, to cause precipitation thereof.

10. The method of extracting manganese values from ore comprising in subjecting said ore to a water solution of a chloride of a metal whose sulphate is substantially insoluble in water and in a water solution of sulphur dioxide, and then treating the resultant solution with calcium carbonate.

11. The method of extracting manganese values from ore comprising in subjecting said ore to a water solution of calcium chloride and sulphur dioxide, and then treating the resultant solution with calcium carbonate.

12. The method of extracting manganese values from its ore, comprising in subjecting said ore to a water solution of a soluble chloride of a metal whose sulphate is substantially insoluble in water, and a water solution of sulphur dioxide, treating the materials in the solution with oxygen to form an insoluble sulfate of the metal, and manganese chloride and treating the resultant solution with a carbonate to precipitate metallic elements in said solution other than manganese, subjecting solution manganese chloride so obtained to the action of calcium carbonate at high temperature and pressure in the absence of air to obtain the manganese as carbonate.

13. The method of extracting manganese values from its ore, comprising in subjecting said ore to a solution of calcium chloride, containing dissolved sulphur dioxide, adding an oxidizing agent to the solution of sulfites so obtained and treating resultant solution with powdered calcium carbonate at atmospheric pressure to precipitate the metallic elements in said solution other than manganese, heating the manganese chloride solution so obtained in the presence of powdered calcium carbonate at high temperature and pressure thus obtaining the manganese as carbonate.

14. A method of recovering manganese from ores containing manganese carbonate and manganese oxide which comprises subjecting the ores to the action of a solution of sulphur dioxide and a chloride of a metal whose sulphate is insoluble in the solution, and subsequently subjecting the solution to the action of an oxidizing agent whereby to cause the precipitation of the insoluble sulphate of said metal, removing the precipitate and subsequently precipitating the manganese contained in the solution.

15. A method of extracting manganese from ores containing manganese oxide and manganese carbonate which comprises treating the ores with a solution of a chloride of a metal selected from a group comprising calcium, barium, strontium and lead, in the presence of a solution of sulphur dioxide, subsequently treating the resultant solution with an oxidizing agent whereby to cause precipitation of the metals of said group as insoluble sulphates, removing the precipitate and precipitating the manganese.

CLYDE C. DE WITT.